May 2, 1933.　　　　　J. H. WIGGINS　　　　　1,906,685
STORAGE TANK FOR VOLATILE GASES AND LIQUIDS
Filed Feb. 6, 1928

INVENTOR:
J. W. WIGGINS.
By Bakewell & Church
ATTORNEYS.

Patented May 2, 1933

1,906,685

UNITED STATES PATENT OFFICE

JOHN H. WIGGINS, OF TULSA, OKLAHOMA

STORAGE TANK FOR VOLATILE GASES AND LIQUIDS

Application filed February 6, 1928. Serial No. 252,403.

This invention relates to large metal tanks of the kind that are used for storing volatile liquids and gases, which tanks are used extensively in the oil fields for storing oil and often have a diameter in excess of 100 ft.

One object of my invention is to provide a storage tank of the type mentioned that is equipped with a metal roof, which, in addition to being capable of moving bodily vertically relatively to the stationary side wall of the tank, is provided with a stabilizing means that maintains the roof in proper balance.

Another object is to provide a storage tank of great capacity whose upper end is closed by a metal roof that is capable of moving vertically relatively to the stationary side wall of the tank so as to vary the height of the space between the roof and the bottom of the tank, and is also capable of flexing vertically so as to function or act as a so-called "breather type" roof. Other objects and desirable features of my invention will be hereinafter pointed out.

To this end I have devised a storage apparatus of the general type mentioned, that is composed of a tank open at is upper end, a roof for said tank formed of metal and combined with the tank in such a way that said roof is capable of moving vertically relatively to the side wall of the tank to vary the height of the space between the roof and the bottom of the tank, a depending portion at the peripheral edge of said roof submerged in liquid so as to constitute a liquid seal for the space bounded by the roof and the bottom and stationary side wall of the tank, and a means combined with said roof that will impart additional stability to the roof or counteract strains or forces tending to throw the roof out of balance.

Figure 1 of the drawing is a vertical transverse sectional view of a liquid storage tank constructed in accordance with my present invention, illustrating the roof of the tank flexed upwardly and also bodily raised slightly so as to increase the volume of the vapor space between the surface of the liquid in the tank and the underside of the roof.

Figure 1:
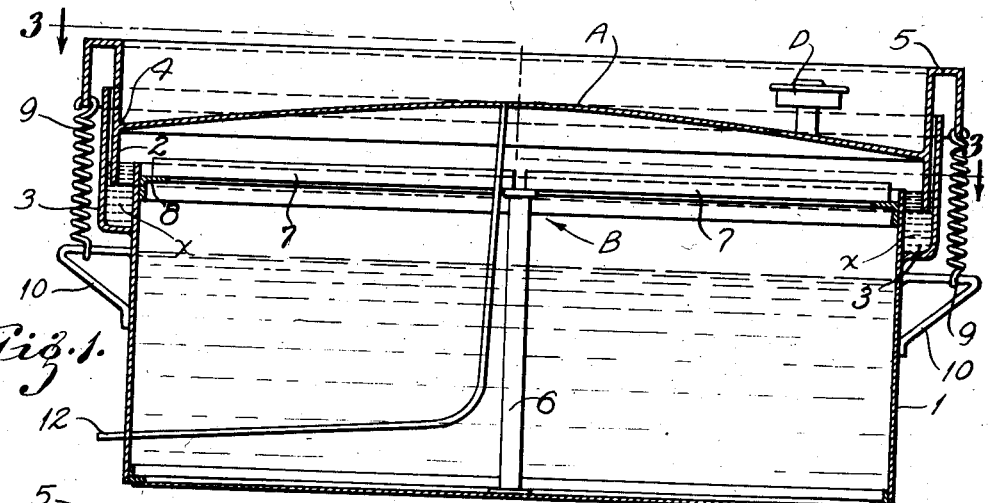

In the preferred form of my invention herein illustrated the tank is provided with a side wall that comprises a stationary lower portion 1 and a vertically-movable upper portion 2, the space or joint between said portions being sealed by a body of sealing liquid $x$ contained in a trough 3 carried by the stationary portion 1 of the side wall and arranged preferably, on the outside of same with the top edge of said trough terminating at a point considerably above the top edge of said stationary wall portion 1. The roof or top A of the tank is formed from metal sheets or plates connected together in such a way as to form a one-piece imperforate diaphragm whose peripheral edge is rigidly connected by a gas-tight joint 4 to the vertically-movable upper portion 2 of the side wall of the tank. Hence, the roof may be said to constitute a vertically-movable closure for the upper end of the tank, combined by a liquid seal with the stationary side wall of the tank. Said roof can either be constructed in the form of a limber sheet, or it can be constructed in the form of a rigid member or structure. In order to prevent rain from entering the trough 3, which holds the sealing liquid $x$, a hood 5 is provided for said trough, which hood is herein illustrated as being formed by a substantially inverted, channel-shaped member connected to the movable portion 2 of the side wall and arranged so as to project laterally and downwardly over the outer wall of the trough 3.

A supporting structure, designated as an entirety by the reference character B, is arranged inside of the tank so as to sustain the roof A when the level of the liquid in the tank is below the top edge of the stationary portion 1 of the side wall, or when the upward pressure exerted on the underside of the roof by the gas in the space between the roof and the surface of the liquid in the tank is less than the weight of the roof, said supporting structure B also being utilized to sustain the plates from which the roof A is constructed during the operation of fabricating the roof and connecting it to the depending sealing element at the peripheral edge of the roof that constitutes the movable portion 2 of the side wall. The supporting structure B can be formed in various ways, but it is herein illustrated as comprising a center post 6 that sustains the inner ends of a plurality of radially-disposed supporting members 7 sustained at their outer ends by an angle 8 or brackets connected to the inner face of the stationary portion 1 of the side wall and arranged either horizontally or with their inner ends inclined downwardly slightly. As previously stated, means is provided for imparting sufficient stability to the roof to insure its remaining in a properly balanced condition, and thus successfully performing the function for which it is employed. In the form of my invention herein illustrated the means just referred to is formed by suitable springs 9 that are connected at their lower ends to laterally-projecting brackets 10 on the stationary side wall 1 of the tank and connected in their upper ends to the hood 5 or some portion of the roof, in such a manner that they counteract forces or strains exerted on the roof in a direction tending to throw the roof out of balance. Obviously, various other means could be substituted for the springs 9 without departing from the spirit of my invention. I prefer to construct the roof A in the form of a limber sheet which is capable of flexing upwardly a limited distance relatively to the portion 2 of the side wall of the tank to which it is connected, so as to function as a "breather type" roof, and automatically increase the vapor space above the surface of the liquid in the tank. Accordingly, if the gases in the space between the surface of the liquid in the tank and the underside of the roof expand, the roof will flex upwardly, as shown in Figure 1, sufficiently to provide for the expansion of the gases, and thus prevent the roof from being subjected to destructive strains. If the upward pressure exerted on the underside of the roof is unequal, for example, if it is greater at the right hand side of the tank, looking at Figure 1, the right hand side of the roof will start to rise, thereby increasing the tension on the springs 9 connected to this portion of the roof, with the result that the upward movement of this portion of the roof will be momentarily checked or arrested until the left hand side of the roof rises sufficiently to place the springs connected to same under substantially the same tension. It will thus be seen that in a tank roof of the construction above described the roof is capable of flexing in a direction to automatically increase the volume of the vapor space in the tank; the roof is also capable of bodily moving upwardly relatively to the stationary portion 1 of the side wall of the tank, thereby increasing the vapor space still more, and during said bodily upward movement, the roof is maintained in a substantially horizontal position and is prevented from being thrown out of balance by the tension devices 9, or other means employed to stabilize the roof and maintain it in proper balance. When the roof rises so high that the depending sealing element on the roof that constitutes the movable portion 2 of the side wall, nearly leaves the sealing liquid in which it is submerged, then some of the gas on the underside of the roof will escape underneath said movable sealing element or side wall portion 2, thereby preventing an abnormal pressure or dangerous pressure from being created in the tank. The roof can be provided with a conventional vacuum relief valve D that will open automatically, and thus admit air to the tank when liquid is being drawn out of the tank.

Figure 2:
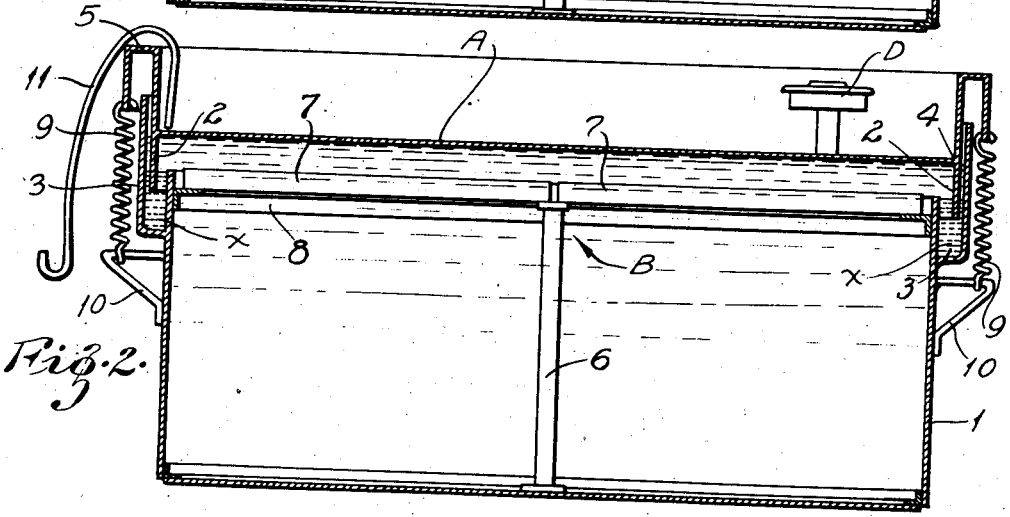
Figure 2 is a similar view, illustrating the roof of the tank in an elevated position and floating upon or sustained by the liquid in the tank.
Figure 3:
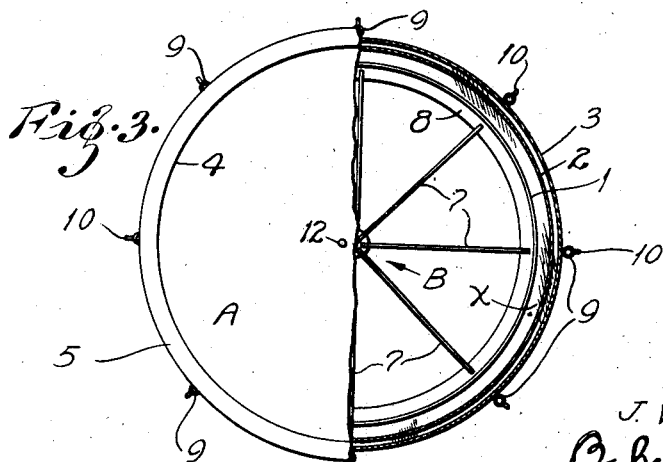
Figure 3 is a view, partly in top plan and partly in horizontal section, taken on the line 3—3 of Figure 1.

In view of the fact that the roof A is capable of moving bodily upwardly or downwardly a limited distance relatively to the stationary portion 1 of the side wall of the tank, it is possible to fill the tank with liquid to a height or level above the top edge of the stationary side wall 1 of the tank. At such times the roof floats upon and is sustained by the liquid in the tank, as shown in Figure 2, and the depending portion at the peripheral edge of the roof is sealed by the liquid on which the roof floats.

The tank can be equipped with any suitable kind of device or apparatus for draining the top surface of the roof. In Figure 2 of the drawing I have illustrated a siphon drain 11 leading from the top surface of the roof and extending laterally and downwardly over the hood 5 attached to the movable portion 2 of the side wall of the tank. In Figure 1 of the drawing I have illustrated the tank equipped with a gravity drain formed by a flexible drain pipe 12 leading from the top side of the roof through the liquid in the tank and extending to the outside of the tank at a point near the bottom of the side wall of same. A drain of the kind shown in Figure 1 will not function when the roof is in an upwardly flexed condition, as shown in Figure 1, but in view of the fact that rain falling onto the roof causes the gases in the tank to cool and contract, thereby permitting the roof to flex downwardly, any rain water which falls on the top side of the roof will be carried off of same by the drain pipe 12 rapidly enough to eliminate the possibility of the roof being sunk by an excessive rain load.

Having thus described my invention, what I claim as new and desire to secure by Letters Patent is:

1. A tank for storing gases and volatile liquids provided with a side wall comprising an upper portion that is capable of moving vertically a limited distance relatively to the stationary lower portion of the side wall, means for sealing the joint or space between said movable portion and stationary portion, a top or roof connected to the movable portion of the side wall, and a resilient means combined with said roof for counteracting unequal forces or loads exerted on the roof tending to throw it out of balance.

2. A tank for storing gases and volatile liquids provided with a side wall comprising an upper portion that is capable of moving vertically a limited distance relatively to the stationary lower portion of the side wall, means for sealing the joint or space between said movable portion and stationary portion, a top or roof connected to the movable portion of the side wall, and tension springs connected with the peripheral portion of the roof and with the stationary portion of the side wall of the tank for exerting a downward force on the roof.

3. A tank for storing gases and volatile liquids provided with a side wall that comprises a stationary lower portion and an upper portion that is capable of moving vertically relatively to said lower portion, means for preventing the contents of the tank from escaping through the joint between the movable and stationary portions of the side wall, a supporting structure in the tank arranged adjacent the top edge of the stationary portion of the side wall, a flexible roof connected to the movable portion of the side wall and normally sustained by said supporting structure, said roof being capable of flexing upwardly to increase the volume of the vapor space in the tank, and a resilient means combined with the roof which tends to prevent the upper portion of the side wall from moving upwardly but which is capable of permitting said upper portion to bodily move with the roof under certain conditions.

4. In a tank for storing gases and volatile liquids, the combination of a stationary side wall, a metal roof arranged so as to be capable of moving bodily vertically relatively to said stationary side wall and constructed so as to be capable of flexing upwardly to increase the volume of the vapor space in the tank, and a liquid seal for protecting the space or joint between the flexible roof and said stationary side wall.

5. In a storage apparatus, the combination of a tank provided with a stationary side wall, a metal roof for said tank arranged so as to be capable of moving bodily towards and away from the bottom of the tank, said roof being constructed so as to be capable of flexing upwardly and downwardly to vary the volume of the vapor space of the tank, and a liquid seal for the peripheral edge of said roof.

6. In a storage apparatus, the combination of a tank provided with a stationary side wall, a metal roof adapted to float on the liquid in the tank and move bodily relatively to said side wall as the level of the liquid in the tank varies, also said roof being constructed so as to function as a breather type roof, and a stabilizing means that is adapted to exert pressure on the roof in a substantially vertical direction and in opposition to forces or pressures tending to throw the roof out of balance.

7. In a storage apparatus, the combination of a tank provided with a stationary side wall, a metal roof adapted to float on the liquid in the tank and move bodily relatively to said side wall as the level of the liquid in the tank varies, also said roof being constructed so as to function as a breather type roof, a depending sealing element on the roof normally submerged in the liquid on which the roof floats, and a stabilizing means for exerting pressure on the roof in a substantially vertical direction, in opposition to counteracting forces or pressures tending to throw the roof out of balance.

JOHN H. WIGGINS.